Dec. 11, 1956     A. H. ISENBERG     2,773,513
SUBTERRANEAN INSULATED CONDUIT UNIT HAVING SPACER
CHANNEL BETWEEN PIPES
Filed Dec. 22, 1953

INVENTOR.
ALEXANDER H. ISENBERG
BY

ATTORNEY

United States Patent Office 2,773,513
Patented Dec. 11, 1956

2,773,513

SUBTERRANEAN INSULATED CONDUIT UNIT HAVING SPACER CHANNEL BETWEEN PIPES

Alexander H. Isenberg, Woodside, Calif.

Application December 22, 1953, Serial No. 399,781

4 Claims. (Cl. 138—65)

This invention relates to thermally insulated subterranean conduits having tracer pipes and more particularly relates to improvements in such conduits in which spacer channels are provided between thermally insulated conveyor and tracer pipes.

Such thermally insulated conduits are generally employed in the subsurface or subterranean conveying of fluids of relatively varying temperatures, and in the present invention are especially adapted for manufacture as prefabricated units at a plant and shipped to place of installation.

To more fully appreciate the invention it is to be noted that it is well known to convey either hot or cold fluid in subterranean thermally insulated conduits, and there has been a well known practice of employing in such conduits a main conveyor pipe and a parallel so-called tracer pipe as a return pipe for steam, for liquids, or for other purposes ancillary to the flow in the conveyor pipe.

The present invention has reference especially to structures of subterranean thermally insulated conveyor conduits in which a layer of moisture impervious material such as bitumen surrounds the insulation and the conduit enclosed therein, and in turn is externally encased in an outer forming casing of relatively thin metal into which the bitumen may be poured while in a hot or molten fluid state and flow around the insulation and harden in situ.

It is desirable to provide space between the conveyor and tracer pipes and to provide temperature transference between the pipes, since expansion and contraction are different in pipes conveying fluids of varying temperatures, and also for practical steps of manufacture.

An example of such utility may be noted in water mains employed in cold climates where the ground and water in the main might normally freeze and create a condition dangerous to a community where water is a necessity for industry, household purposes and fire fighting.

The present invention comprises a prefabricated conduit unit consisting of a main conveyor pipe and a parallelly spaced tracer pipe each enclosed in thermal insulation which has a relatively communicating gap in its circumference providing a parallel channel between the pipes, with a spacer channel member therebetween capable of supporting the weight of the heavy main conveyor pipe and preferably capable of heat transfer by contacting the two pipes, the pipes and the insulation therearound being enclosed in a moisture-impervious body such as bitumen, which is fluid when heated and congeals at normal temperature, and which is poured hot into an outer forming casing through an opening therein, the outer casing being spaced from the insulation by a spacing spider band so that the bitumen may flow both longitudinally and circumferentially around the insulation and enclosed pipe.

At the opposite ends the conveyor pipe, the tracer pipe, and the spacer channel therebetween extend beyond the ends of the body of insulation and the bitumen layer in order that adjoining pipes of aligned similar conduit units may be conveniently welded together at time of installation as a conduit system in the ground.

A more detailed description of one embodiment of the invention is set forth in the following description and illustrated in the accompanying drawing in which.

Figure 1:
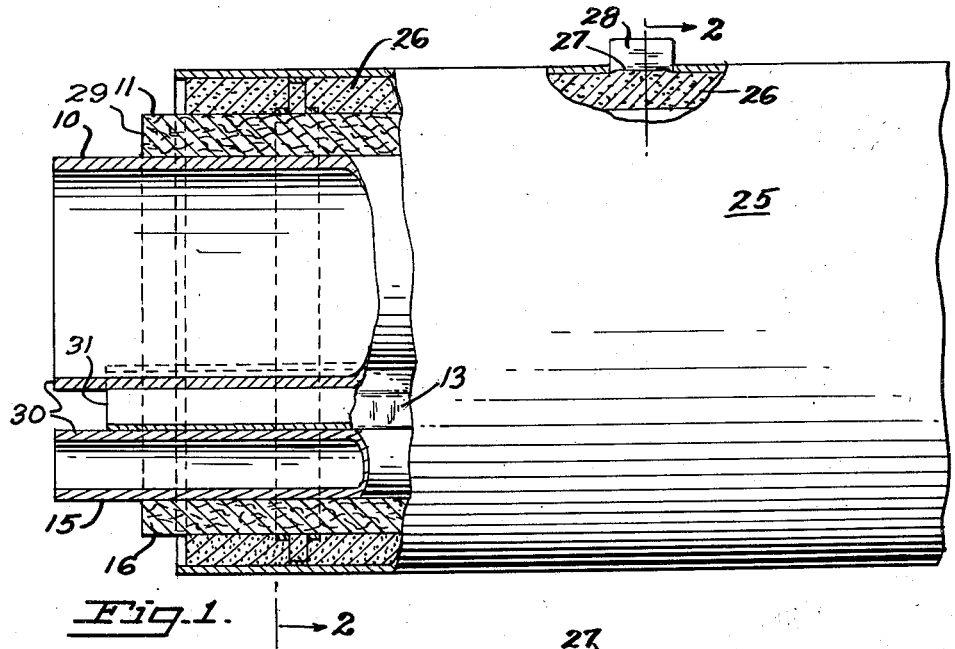
Fig. 1 is a fragmentary longitudinal side elevational view partly in section.
Figure 2:
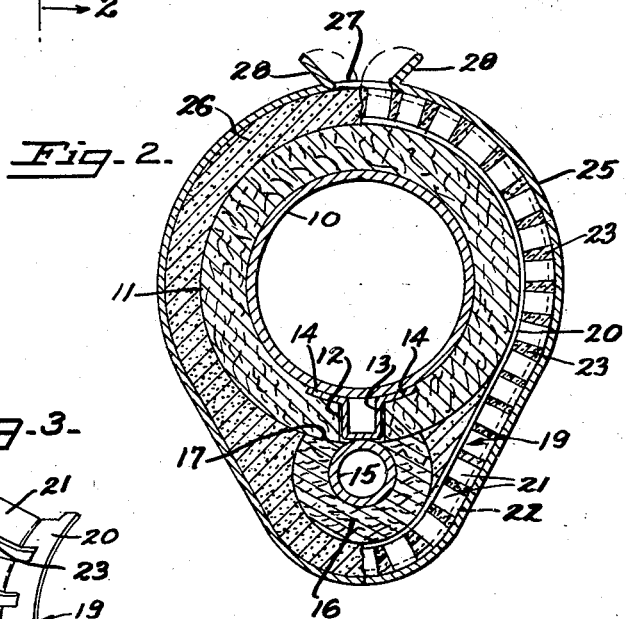
Fig. 2 is a composite of fragmentary lateral transverse sections relatively longitudinally spaced on lines 2—2 of Fig. 1, a portion of a layer of bitumen being broken away to better illustrate a spacer spider member.
Figure 3:
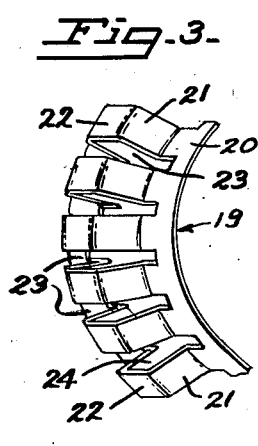
Fig. 3 is a fragmentary view in perspective of a spacer spider member.

Referring to the drawing in which like reference characters indicate corresponding parts in the several views, 10 is a relatively heavy main conveyor pipe for any suitable fluid enclosed within a body of thermal insulating material 11, such as magnesium, asbestos or the like, the thermal insulation terminating short of a complete circumference of the conveyor pipe providing a longitudinal channel or gap 12 between opposed longitudinal edges of the insulation material at said gap. Within the longitudinal gap 12 is mounted a longitudinal spacer channel member 13 of generally rectangular lateral cross-section, preferably of formed sheet metal provided with outwardly diverging flanges 14 at the upper or free edges of the channel walls, the flanges contacting the main conveyor pipe and supporting the relatively heavy conveyor pipe 10 and thus protecting the opposed portions or gap of the walls of the spaced insulation against damage from the weight of the conveyor pipe, and also serving as a spacer and thermal conductor. The depth of the channel member is substantially similar to the thickness of the body of the insulation material around the conveyor pipe.

Immediately underlying the spacer channel and spaced parallel with the conveyor pipe is a tracer pipe 15, also preferably relatively heavy, the tracer pipe being of smaller diameter than the conveyor pipe and being enclosed within a body of thermal insulation 16 except at that spaced portion 17 which communicates with the gap 12, permitting the spacer channel 13 to rest on the relatively heavy tracer pipe and thus support the conveyor pipe and provide heat transference therebetween. The body of insulation 16 at spaced portion 17 is shaped to conform to and closely abut the insulation 11 around the conveyor pipe.

The two pipe members with the spacer channel therebetween and the enclosing insulation are secured in fixed relation by binding therearound of a spacer spider band generally indicated 19 preferably of the type shown in my Patent No. 2,664,112 dated December 29, 1953, which provides a binder strip or band 20 closely hugging the circumference of the insulation members and having relatively circumferentially spaced radially extended walls 21 which are transversely spaced and joined at their outward end as at 22 thus providing spaces 23 through which the heated bitumen may flow longitudinally, and spaces 24 through which the bitumen may flow circumferentially, and thus flow completely around and enclose the insulation.

Formed circumferentially around the spacer spider is a relatively thin outer forming casing 25 which is spaced from the thermal insulation by the spacing spider 21 and a body of bitumen 26 is poured into the forming casing through an opening 27 while in hot fluid condition, whereupon it may flow longitudinally and circumferentially through the openings in the spider and around the insulation to provide a moisture impervious layer, the opening 27 being cut into the body of the outer casing providing wings 28 which may be folded down to close the opening whereupon the bitumen hardens in situ.

The conduit units are especially adapted for fabrication at a plant removed from place of installation in the ground, which obviously requires a joining of the similarly constructed units at place of installation to provide a conduit system. Such joining of units requires the welding of abutting ends of the conveyor and tracer pipes to adjoining similar pipes in other units. For this purpose the opposite terminal end portions of the conduit unit are of similar structure, that is, the insulation extends beyond the outer casing and bitumen layer as at 29 and the conveyor pipe 10 and tracer pipe 15 extend beyond the terminal end of the insulation 11 as at 30 and terminate in a single vertical plane whereby, when they abut the end of similar pipes in an adjoining aligned unit there may be convenient space for a welding operation. Since it is not necessary to weld adjoining lengths of the spacer channel 13, it is not essential that the spacer channel 13 should so extend beyond the end of the insulation, though it is preferred that it do so as at 31 although it terminates short of the ends of the conveyor and tracer pipes. It is also preferred that the terminal end of the insulation material 11 shall extend beyond the end of the poured bitumen but shall stop short of the adjacent ends of the conveyor and tracer pipes.

The invention herein is in the described conduit unit, but it may be observed that when a joint is made of aligned conduit units by welding of end-to-end conveyor and tracer pipes an additional strip of spacer channel may be slid lengthwise between the pipes to overlap the joint, whereupon a loose insulating cement may be packed around the joint and an outer forming casing placed around the joint and liquid bitumen poured thereinto to seal the joint against moisture. It is customary to anchor the pipes to a foundation in the ground at intervals and to provide suitable expansion loops therein but the latter two facilities do not form a part of the present invention.

While the description of relatively heavy pipes and relatively thin outer forming casing are in relation to each other and the intended use of the invention it should be noted that the conduits when buried in the ground must sustain substantial weight of earth as well as its own weight. The relatively heavy conveyor pipes are sufficient for that purpose, but the relatively thin outer casing is merely a forming member for the moisture impervious bitumen and is not heavy or thick enough to be classed as a load-supporting casing or pipe.

Having thus described the invention what is claimed as new and patentable is:

1. A thermal and moisture insulated conduit unit including a main conveyor pipe, an enclosing body of thermal insulation circumferentially and longitudinally thereof, said insulation having a gap in its circumference providing a channel longitudinally of the pipe and open radially to the conveyor pipe, a tracer pipe of smaller diameter than the conveyor pipe and spaced parallel to the conveyor pipe, an enclosing body of thermal insulation circumferentially and longitudinally of the tracer pipe and having an open space in its circumference communicating with said gap in the other insulation body, a spacer channel member in said gap bearing on the tracer pipe and extending to the conveyor pipe, an outer casing spaced from and enclosing the said thermally insulated pipes, and a moisture-impervious layer between the thermal insulation and the outer casing.

2. A conveyor conduit having the elements of claim 1 and in which the spacer channel member has relatively diverging flanges at its edges contacting the conveyor pipe.

3. A conveyor conduit having the elements of claim 1 and in which the opposite end portions of the conveyor and tracer pipes extend beyond the relatively adjacent ends of the other members.

4. A thermal and moisture insulated conduit unit having the elements of claim 1 and in which the terminal end of the spacer channel member extends beyond the terminal end of the layers of thermal insulation and moisture impervious bitumen, and the conveyor and tracer pipes extend beyond any of said members and terminate in substantially the same plane with each other.

References Cited in the file of this patent

UNITED STATES PATENTS

| | | |
|---|---|---|
| 528,291 | Cummings | Oct. 30, 1894 |
| 1,799,672 | Burke et al. | Apr. 7, 1931 |
| 2,330,966 | Gottwald et al. | Oct. 5, 1943 |
| 2,347,855 | Varga | May 2, 1944 |
| 2,532,587 | Williamson | Dec. 5, 1950 |
| 2,545,030 | Isenberg et al. | Mar. 13, 1951 |
| 2,650,801 | Collito | Sept. 1, 1953 |
| 2,664,112 | Isenberg | Dec. 29, 1953 |

FOREIGN PATENTS

| | | |
|---|---|---|
| 572,942 | France | Mar. 1, 1924 |